(12) United States Patent
Daole (10) Patent No.: US 9,140,909 B2
(45) Date of Patent: Sep. 22, 2015

(54) EYEGLASS STORAGE SYSTEM

(71) Applicant: Michael Daole, Ashland, OR (US)

(72) Inventor: Michael Daole, Ashland, OR (US)

( * ) Notice: Subject to any disclaimer, the term of this patent is extended or adjusted under 35 U.S.C. 154(b) by 104 days.

(21) Appl. No.: 13/747,951

(22) Filed: Jan. 23, 2013

(65) Prior Publication Data
US 2013/0188122 A1    Jul. 25, 2013

Related U.S. Application Data (60) Provisional application No. 61/589,512, filed on Jan. 23, 2012.

(51) Int. Cl.
*G02C 3/04* (2006.01)
*G02C 11/00* (2006.01)
*A45C 11/04* (2006.01)
*A45C 11/00* (2006.01)
*A45C 15/00* (2006.01)
*H04B 1/3888* (2015.01)

(52) U.S. Cl.
CPC ............... *G02C 11/00* (2013.01); *A45C 11/00* (2013.01); *A45C 11/04* (2013.01); *A45C 15/00* (2013.01); *G02C 3/04* (2013.01); *A45C 2011/002* (2013.01); *H04B 1/3888* (2013.01)

(58) Field of Classification Search
CPC .............. G02C 1/06; G02C 3/04; G02C 5/06; G02C 5/128; G02C 11/00; G02C 2200/02; G02C 2200/06
USPC ........................................ 351/41, 63, 64, 158
See application file for complete search history.

(56) References Cited

U.S. PATENT DOCUMENTS 4,707,088 A * 11/1987 Tabacchi ..................... 351/56
6,709,127 B2 * 3/2004 Lu ................................ 362/109

* cited by examiner

*Primary Examiner* — Huy K Mai
(74) *Attorney, Agent, or Firm* — Antonio Papageorgiou, Esq.; Meister Seelig & Fein LLP (57) ABSTRACT

An eyeglass storage system is provided for use in combination with electronic devices, such as smart phones. The storage systems disclosed herein include a casing having a storage cavity within the casing that houses compact reading glasses. The casing may be a unit that attaches to electronic devices, or may be a combination casing that houses the electronic device along with the reading glasses.

13 Claims, 9 Drawing Sheets

Magnets

Ball and Socket

Snaps
Oval shape of glasses forces fingers apart. Fingers snap back into place once lens is fully seated.

EYEGLASS STORAGE SYSTEM

RELATED APPLICATION

This application claims the benefit of U.S. Provisional Application No. 61/589,512, filed Jan. 23, 2012, which is incorporated herein by reference.

BACKGROUND

The present application relates generally to storage cases and more specifically it relates to cases for storing eyeglasses.

Cases are generally used to protect the products placed therein from damage. For example, eyeglass cases protect lenses from scratches. Smart phone cases similarly protect the touch screen surface as well as other parts of the phone from damage. Often, users of smart phones need to use their glasses to interact with the device. This necessarily requires that the user fumble with a number of cumbersome cases, i.e., cases for the glasses and for the smart phone, before the user can meaningfully use the device. Accordingly, there is a need for eyeglass cases that do not exhibit these shortcomings.

SUMMARY

This application generally provides an eyeglass storage system for use in combination with electronic devices, such as smart phones. The storage systems disclosed herein include a casing having a storage cavity within the casing that houses compact reading glasses. The casing may be a unit that attaches to electronic devices, or may be a combination casing that houses the electronic device along with the reading glasses.

In one embodiment, an eyeglass storage system is provided that includes eyeglasses having a frame without temples, and a casing having an inner skin and an outer shell that define a cavity with an opening. The frame of the eyeglasses has opposing front and back planer surfaces, lenses within the frame do not protrude beyond the front and back planer surfaces of the frame, and the cavity has a height greater than a distance between the planer surfaces of the frame so as to slidingly receive the eyeglasses into the cavity through the opening.

In one embodiment, the eyeglasses are reading glasses.

In one embodiment, the front and back planer surfaces of the frame are essentially parallel to each other.

In one embodiment, at least one of the inner skin and the outer shell are parallel to the planer surfaces of the frame.

In one embodiment, the thickness of the frame is about ⅛ inches.

In one embodiment, the height of the cavity is about 3/16 inches.

In one embodiment, the frame comprises a pull tab on one end of the frame and wherein the pull tab engages with the casing to removably interlock the frame to the casing.

In one embodiment, the pull tab extends outward from at least one of the front and back planer surfaces of the frame.

In one embodiment, the frame and casing interlock using a magnetic connection.

In one embodiment, the frame and casing interlock using a ball and socket connection.

In one embodiment, the frame and casing interlock using a pair of fingers located within the casing that engage the frame around at least a portion of the frame.

In one embodiment, the casing has a housing for an electronic device.

In one embodiment, the casing comprises a means for attaching the casing to an electronic device.

In one embodiment, the means for attaching the casing to an electronic device is at least one of an adhesive and a hook and loop fastener.

In one embodiment, an eyeglass storage system is provided that includes reading eyeglasses having a frame without temples and a pull tab on one end of the frame; and a casing having an inner skin and an outer shell essentially parallel to each other that define a cavity with an opening. The frame of the eyeglasses has opposing front and back planer surfaces essentially parallel to each other, lenses within the frame do not protrude beyond the front and back planer surfaces of the frame, and the cavity has a height greater than a distance between the planer surfaces of the frame so as to slidingly receive the eyeglasses into the cavity through the opening and to interlock the frame to the casing.

Additional aspects of the present invention will be apparent in view of the description which follows.

DETAILED DESCRIPTION

Figure 1A:
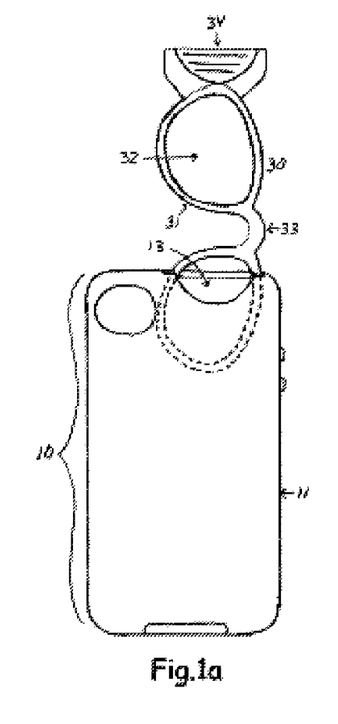
FIGS. 1a-1c are rear views of an eyeglass case according to one embodiment of the cases discussed herein.
Figure 1B:
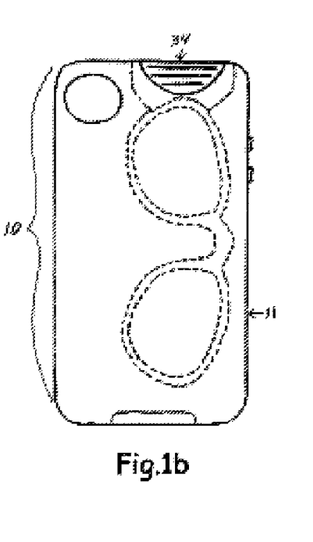
Figure 1C:
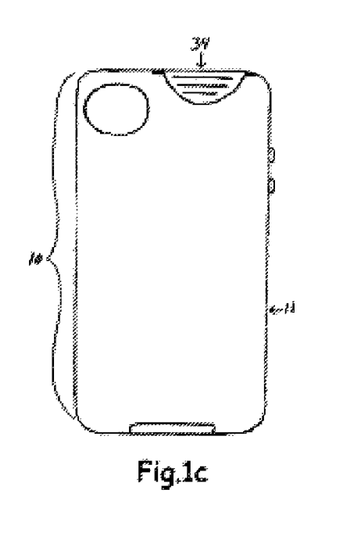

FIG. 1a shows the storage system, according to at least one embodiment of the systems disclosed herein, with reading glasses (30) being inserted into the opening (13) of the casing (10). In FIGS. 1b-1c, the reading glasses (30) are shown fully seated within the storage cavity (20) of the casing (10).

Figure 5:
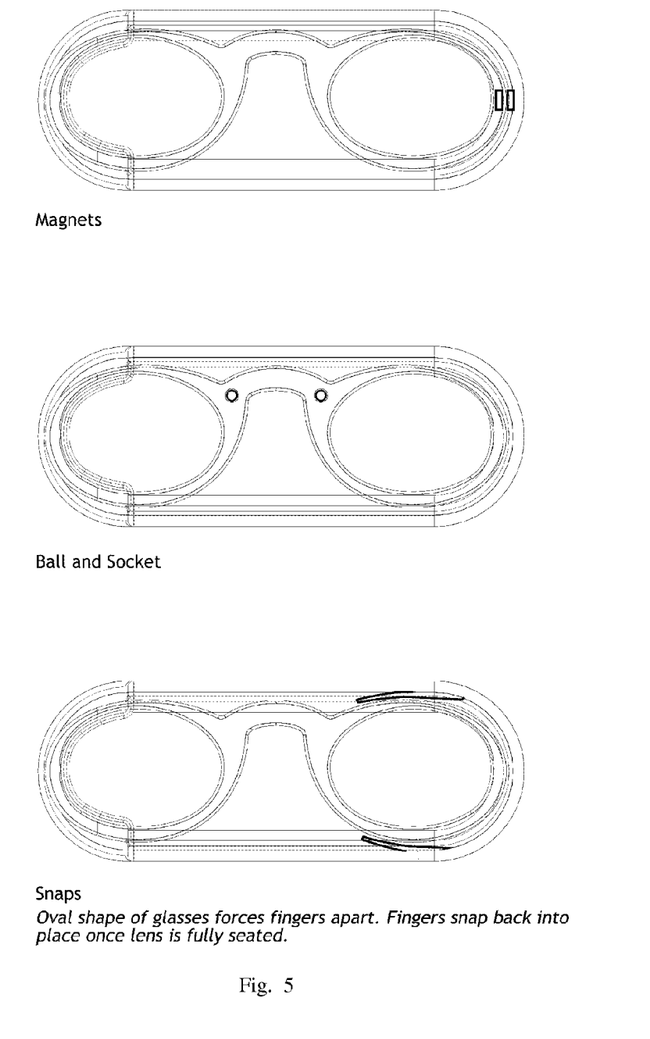
FIG. 5 are top views showing various mechanisms for coupling the glasses and the eyeglass case according to another embodiment of the cases discussed herein.
Figure 6A:
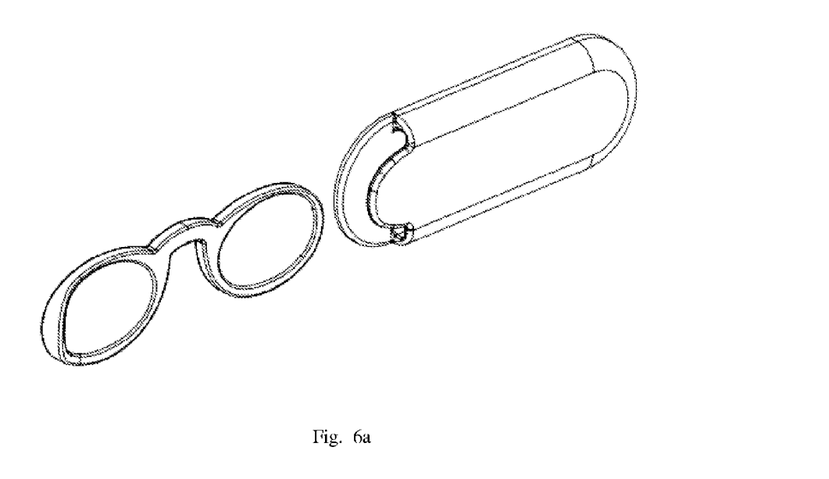
FIGS. 6a-6f are various views of an eyeglass case according to another embodiment of the cases discussed herein.
Figure 6B:
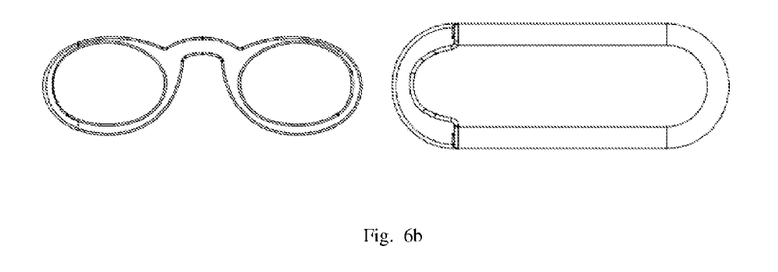
Figure 6C:
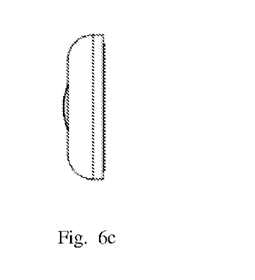
Figure 6D:
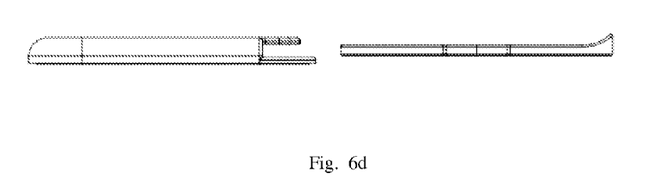
Figure 6E:
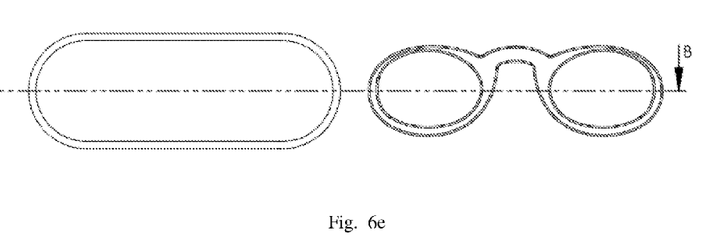
Figure 6F:
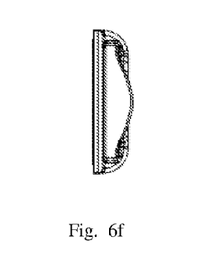
Figure 7A:
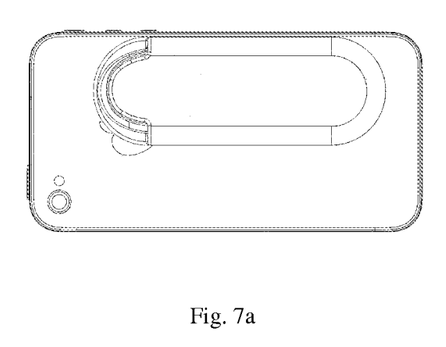
FIGS. 7a-7d are top or bottom views of an eyeglass case according to another embodiment of the cases discussed herein used as a stand.
Figure 7B:
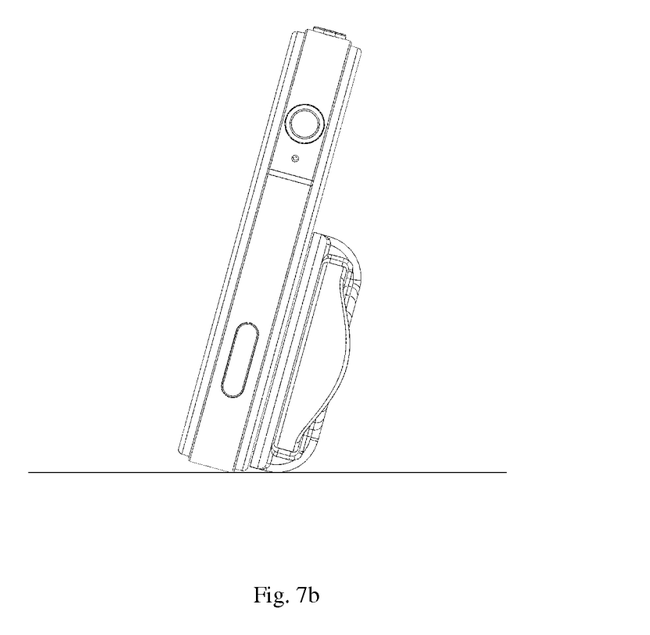
Figure 7C:
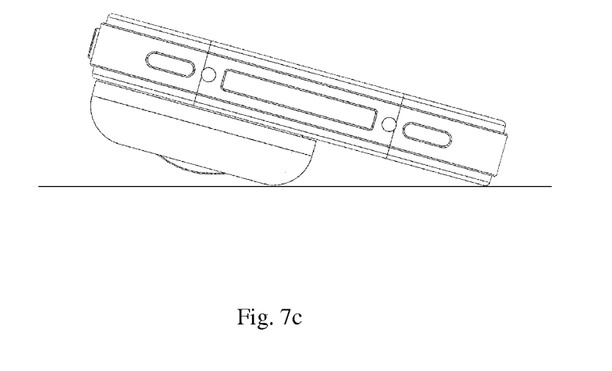
Figure 7D:
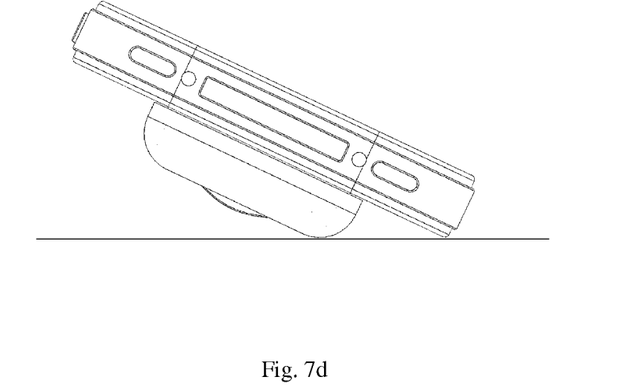

The storage system generally includes compact reading glasses (30) and a casing (10). The casing (10) includes an opening (13) that provides access to the storage cavity (20) within the casing. The cavity (20) is preferably a lengthwise slot extending from the top to the bottom of the casing (10). The dimensions of the reading glasses (30), opening (13), and storage cavity (20) are such that the glasses (30), with its sub-elements, are contained in a compact arrangement within the casing (10). FIG. 1b shows the compact reading glasses (30) at rest (fully inserted) in the storage cavity (20), as seen through a transparent outer shell (11). FIG. 1c shows the casing with a pull tab (34) of the compact reading glasses (30) fully inserted into the reading glasses opening (13), where the two interlock to prevent the glasses (30) from slipping out of the casing (10) unintentionally. Various interlocking means may be used, including those shown in FIG. 5.

Figure 2A:
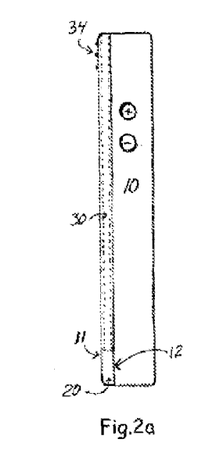
FIGS. 2a-2b are side views of an eyeglass case according to one embodiment of the cases discussed herein.
Figure 2B:
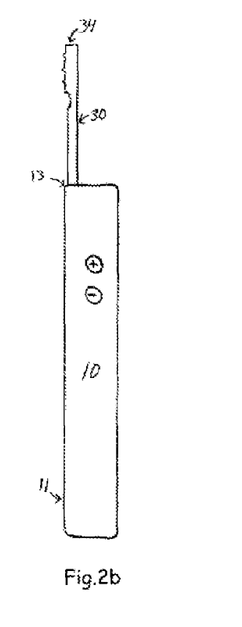

FIGS. 2a-2b are side views of the storage system with the glasses (30) fully and partially inserted into the casing (10), respectively. As can be seen, the storage cavity (20) extends along the inside the casing (10) so that the glasses (30) may be inserted in from the top of the casing (10). As seen here, the storage cavity (20) is sandwiched between the outer shell (11) and the inner protective skin (12) that protects the smart phone from contacting the compact reading glasses (30). The outer shell (11) and the inner protective skin (12) may be parallel to each other, as shown. FIG. 2b shows the compact reading glasses partially inserted into the storage cavity of the casing with the pull tab (34) showing.

Figure 3A:
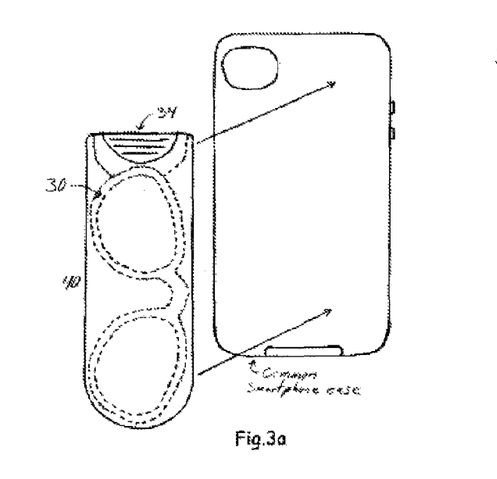
FIGS. 3a-3b are rear and side views of an eyeglass case according to another embodiment of the cases discussed herein.
Figure 3B:
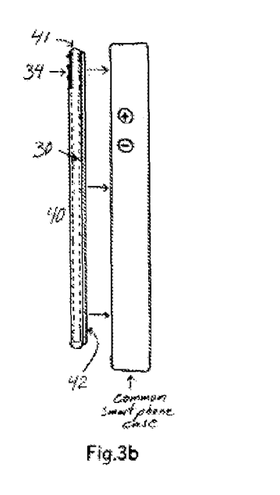
Figure 4A:
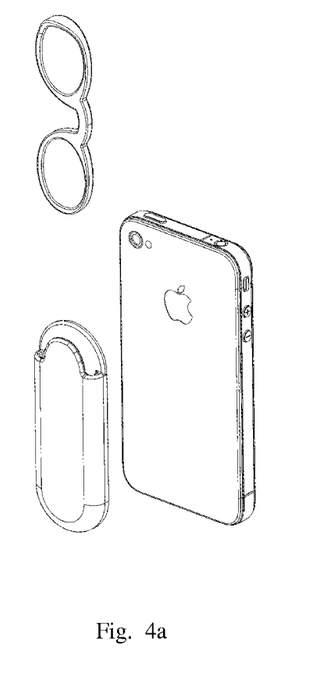
FIGS. 4a-4d are perspective views of an eyeglass case according to another embodiment of the cases discussed herein.
Figure 4B:
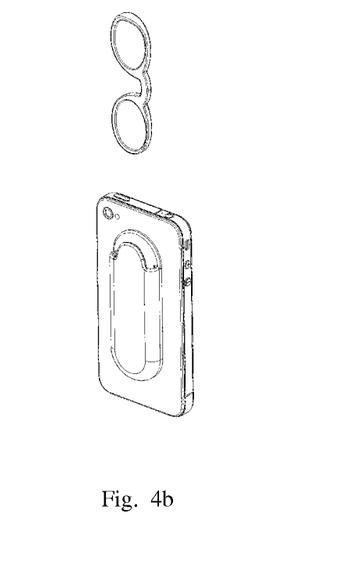
Figure 4C:
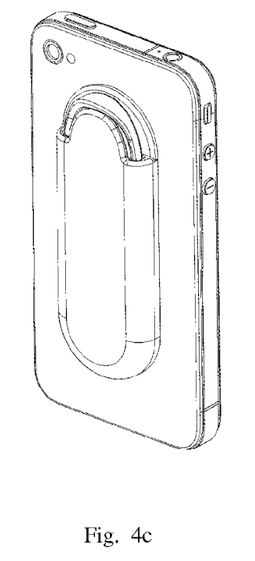
Figure 4D:
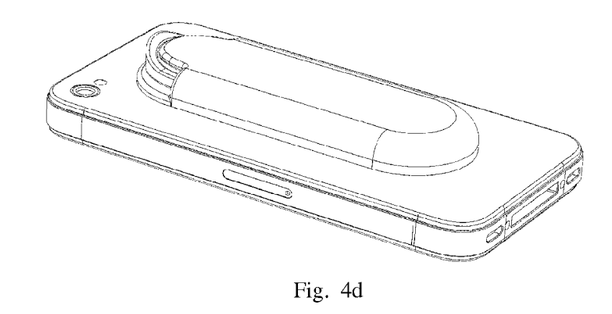

FIGS. 3a-b show a variation of the storage system in both the rear and side views. FIG. 3a shows the satellite case (40) from the rear. Seen clearly, in this instance a much smaller version of the casing (10), which in a more form-fitting way, houses the compact reading glasses (30) inside its own storage cavity (20). The satellite case may adhere or otherwise be attachable to the common smart phone case or to the phone itself, as shown and as indicated by the arrows. FIG. 3b shows the satellite case from the side view. Here the adhesive or other connection means (42) on the bottom of the satellite case can be seen. The arrows indicate that the case will attach to the back of the smart phone case. The satellite embodiment is also shown in FIGS. 4a-7d. Note, the finger tab that is used to grab onto and remove the glasses from the case may protrude out slightly above the level of the case, as seen in FIGS. 6a-6f, or alternatively, the protrusion may be at or below the level of the case so that the case (and phone) rest flat on a table and not rock back and forth when used as a stand as in FIGS. 7a-7d.

In at least one embodiment, the casing (10) is a form fitting cover and/or guard made of various moldable materials to protect common smart phones and other electronic devices from damage. Within the casing (10), occupying its full length and width is a storage cavity (20). The casing (10) is almost identical to many common molded protective casings used today for smart phones and other hand held electronic devices, with the addition that this case provides immediately accessible reading glasses for those who cannot read the information on the device without them.

The casing, shown in FIGS. 1a-1c and 2a-2b, may be approximately ¼ of an inch thicker than most common cases. This ¼ inch difference accommodates the additional thickness for a storage cavity (20) that spans the entire length and width of the back of the casing (10), which may be substantially the same as the back of the smart phone or other electronic device that the casing encloses or otherwise attaches to. The storage cavity (20) alone is completely empty and sized to accept compact reading glasses (30) therein. The cavity (20) lies between the inner protective skin (12), molded to fit over and house the electronic device, and the outer shell (11) of the case. On one end of the casing (10) is the reading glasses opening (13) into which the compact reading glasses (30) enter the storage cavity (20) and slide in a lengthwise direction into their resting place.

Alternatively, the casing (40) for the compact reading glasses (30) may be reduced significantly in size to wrap closely around and house the reading glasses (30) separate from the smart phone case. As seen in FIG. 3, this much smaller satellite case (40), with its own inner protective skin and outer shell, could then be adhered, for example, with adhesive and/or hook and loop fasteners (42), to many common protective cases for smart phones and other electronic devices. In this instance, the compact reading glasses (30) would be inserted into the satellite case for storage via the satellite case opening (41). The satellite case (40) would bring the convenience of immediately accessible reading glasses to any smart phone or hand held device. Examples of the satellite casing embodiment are shown in FIGS. 4a-6f.

The storage cavity (20) is generally a thin space, e.g., of approximately 3/16 of an inch high, between the inner layer of protective casing next to the body of the electronic device and the outer layer of same casing, formed to accommodate compact reading glasses for storage. The storage cavity (20), seen best in FIG. 2a, is an empty compartment between the inner protective skin (12), which serves to protect or otherwise separate the glasses (30) from the smart phone or other electronic device, and the outer shell (11) of the casing. The storage cavity (20) is the resting place of the compact reading glasses (30) when they are not in use.

The compact reading glasses (30) are reading glasses that lack common temples, measure approximately ⅛ inch thick between the inner and outer planer surfaces of the frame (31) (or generally slightly less than the height of the opening (13)), and grip on one's nose while in use. The glasses (30) slide securely into the storage cavity (20) within the casing (10, 40) to be readily available for later use. The compact reading glasses, seen best in FIG. 1a, consist of a pair of common magnified optical lenses (32) held within a frame (31). Importantly, the lenses (32) preferably do not protrude beyond the planer inner and outer surfaces of the frame (31). That is, the frame (31) has a planer structure with opposing sides that are planer, which are essentially perpendicular to the users line of sight when worn and may be essentially parallel to each other, e.g., spaced approximately ⅛ inch apart. The planer surfaces of the frame (31) may also be parallel to the inner protective skin (12) and the outer shell (11). This ensures that all contact of the glasses (30) with the casing (10) will be on planer surface the frame (31), and not on the lenses (32). A flexible nose bridge (33) allows the frame (31) and lenses (32) to span across and rest on one's nose. The nose bridge is preferably flexible and elastic allowing the frame (31) to pinch and grip the nose as well. The dimensions (width and thickness) of the frame elements are preferably such that the frame is sufficiently rigid for one handed use. On one end of the frame (31) is a pull tab (34) that allows the frame (31) to be grasped and removed from the storage cavity (20). When the compact reading glasses are fully inserted into the storage cavity (20) for safe keeping, the pull tab (34) fits snug and interlocks with the reading glasses opening (13).

Alternatively, the compact reading glasses (30) may take on any shape or design that is suitable to fulfill their intended usefulness for this invention: such as the addition of temples as found on most common reading glasses. Temples attach to each end of the frame (31) and extend out to rest on the user's ears, allowing the common reading glasses to be stabilized on the nose for secure use.

The satellite case (40) may be made of any material that satisfies its function. Additionally, besides adhesive, the connection or bond between the satellite case and the smart phone case or hand held device can be made by any and various means including tape, straps, screws, etc. The satellite case may also be shaped in a way to accommodate common style reading glasses that use temples to connect the frame to the user's ears.

Within the outer shell (11) of the casing (10) and the inner protective skin (12) lies the enclosed, but vacant area of the storage cavity (20). Through the reading glasses opening (13) a pair of compact reading glasses (30) slide into the storage cavity, as seen in FIG. 1a, and stop as the pull tab (34) meets and interlocks with the reading glasses opening, as seen in FIGS. 1b and 1c. FIG. 1b is the semi-transparent view to show the compact reading glasses resting inside the storage cavity. FIG. 2a shows the semi-transparent side view of the casing, which also illustrates the location of the storage cavity (20) with a pair of compact reading glasses (30) stored inside in the fully inserted position. FIG. 2b shows the side view of the casing (10) with the compact reading glasses (30) partially out or the storage cavity (20).

In one embodiment, the compact reading glasses (30) may have temples, as found on most common reading glasses, attached to each end of the frame (31). The temples would fold in such a way as to allow the reading glasses to lay relatively flat as they are inserted into the storage cavity (20) through the reading glasses opening (13).

In one embodiment, the protective casing (10) is essentially the same as any common smart phone case with the addition of a storage cavity (20) that contains a pair of compact reading glasses (30) for immediate accessibility to the user. The case may be used by the user that first grasps the casing (10) from the back, holding it by the outer shell (11) in one hand. The smart phone is recessed into and protected on back and all sides by the outer shell (11). The inner protective skin (12) separates the back of the smart phone from the storage cavity (20). The user (in need of reading glasses to see the smart phone information) grasps the pull tab (34) of the compact reading glasses (30) and pulls, sliding the reading glasses out of the storage cavity (20). The user then places the compact reading glasses on his/her nose. The tension of the flexible nose bridge (33) allows the reading glasses frame (31), with fixed lenses (32), to pinch and grip the nose, staying on while in use. The user then reads the needed information. When the user is finished, he/she inserts the compact reading glasses into the storage cavity through the reading glasses opening (13). When the pull tab slides all the way in to meet the reading glasses opening, the two receptacles interlock together and seal the opening. The pull tab may have a texture molded into it to allow for better finger grip.

While the foregoing has been described in some detail for purposes of clarity and understanding, it will be appreciated by one skilled in the art, from a reading of the disclosure, that various changes in form and detail can be made without departing from the true scope of the invention.

What is claimed is:

1. An eyeglass storage system comprising:
    eyeglasses having a frame without temples, the frame comprising a first lens section that surrounds a first lens and a second lens section that surrounds a second lens separated by a bridge section; and
    a casing having an inner skin and an outer shell that define a lengthwise cavity with an opening therein to slidingly receive the eyeglasses within the cavity for storage, wherein the skin has a first surface and a second surface within the cavity opposite the first surface, the first and second surfaces of the skin parallel to each other and separated from each other by a height, wherein the frame of the eyeglasses has opposing front and back planer surfaces that are essentially parallel to each other and that continue over both of the first and second lens sections to surround the first and second lenses, wherein lenses within the frame do not protrude beyond the front and back planer surfaces of the frame, wherein the height between the first and second surfaces of the cavity is greater than a distance between the planer surfaces of the frame, and wherein the eyeglasses are slidingly removable from within the cavity and separated from the casing for use, the eyeglass further having a length measured between a left side and a right side of the frame, and a height measured between a front end and a back end of the frame, a height measured between a top and a bottom.

2. The system of claim 1, wherein the eyeglasses are reading glasses.

3. The system of claim 1, wherein at least one of the inner skin and the outer shell are parallel to the planer surfaces of the frame.

4. The system of claim 1, wherein the thickness of the frame is about 1/8 inches.

5. The system of claim 4, wherein the height of the cavity is about 3/16 inches.

6. The system of claim 1, wherein the frame comprises a pull tab on one end of the frame.

7. The system of claim 6, wherein the pull tab extends outward from at least one of the front and back planer surfaces of the frame.

8. The system of claim 6, wherein the frame and casing interlock via a magnetic connection.

9. The system of claim 6, wherein the frame and casing interlock via a ball and socket connection.

10. The system of claim 6, wherein the frame and casing interlock via a pair of fingers located within the cavity of the casing that separate from each other and snap back into place to engage at least one of the lens sections of the frame as the eyeglasses are inserted into the casing toward a fully seated position.

11. The system of claim 1, wherein the casing has a housing for an electronic device.

12. The system of claim 1, wherein the casing comprises a means for attaching the casing to an electronic device.

13. The system of claim 12, wherein the means for attaching the casing to an electronic device is at least one of an adhesive and a hook and loop fastener.

* * * * *

UNITED STATES PATENT AND TRADEMARK OFFICE
CERTIFICATE OF CORRECTION

PATENT NO. : 9,140,909 B2
APPLICATION NO. : 13/747951
DATED : September 22, 2015
INVENTOR(S) : Michael Daole Page 1 of 1

It is certified that error appears in the above-identified patent and that said Letters Patent is hereby corrected as shown below:

Claims
At Col. 6, claim 1, line 16 delete the following: "a height measured between a top and a bottom"

Signed and Sealed this
Second Day of February, 2016

Michelle K. Lee
*Director of the United States Patent and Trademark Office*